(12) United States Patent
Takamiya et al.

(10) Patent No.: US 10,648,467 B2
(45) Date of Patent: May 12, 2020

(54) TRIPLE GEAR PUMP AND FLUID SUPPLYING DEVICE

(71) Applicant: IHI CORPORATION, Koto-ku (JP)

(72) Inventors: Kenji Takamiya, Tokyo (JP); Seiei Masuda, Tokyo (JP)

(73) Assignee: IHI CORPORATION, Koto-ku (JP)

( * ) Notice: Subject to any disclaimer, the term of this patent is extended or adjusted under 35 U.S.C. 154(b) by 247 days.

(21) Appl. No.: 15/835,066

(22) Filed: Dec. 7, 2017

(65) Prior Publication Data

US 2018/0106253 A1 Apr. 19, 2018

Related U.S. Application Data

(63) Continuation of application No. PCT/JP2015/070384, filed on Jul. 16, 2015.

(51) Int. Cl.

| | |
|---|---|
| *F03C 2/00* | (2006.01) |
| *F03C 4/00* | (2006.01) |
| *F04C 18/00* | (2006.01) |
| *F04C 11/00* | (2006.01) |
| *F04C 14/02* | (2006.01) |
| *F04C 14/24* | (2006.01) |

(Continued)

(52) U.S. Cl.
CPC ............ *F04C 11/001* (2013.01); *F01C 21/02* (2013.01); *F04C 2/084* (2013.01); *F04C 2/102* (2013.01);

(Continued)

(58) Field of Classification Search
CPC .. F04C 2/084; F04C 2/102; F04C 2/14; F04C 11/001; F04C 15/0042; F04C 14/02;

(Continued)

(56) References Cited

U.S. PATENT DOCUMENTS

| | | | | |
|---|---|---|---|---|
| 3,288,076 A | * | 11/1966 | Bjorndal | ................... F04C 2/36 |
| | | | | 418/196 |
| 3,395,646 A | * | 8/1968 | Gelin | .................. F04C 15/0026 |
| | | | | 418/133 |

(Continued)

FOREIGN PATENT DOCUMENTS

| | | |
|---|---|---|
| EP | 2 055 954 A1 | 5/2009 |
| EP | 2 672 119 A1 | 12/2013 |

(Continued)

OTHER PUBLICATIONS

Extended European Search Report dated Feb. 21, 2019 in European Patent Application No. 15898306.4, 5 pages.

(Continued)

*Primary Examiner* — Theresa Trieu
(74) *Attorney, Agent, or Firm* — Oblon, McClelland, Maier & Neustadt, L.L.P.

(57) ABSTRACT

A gear pump is comprised of a driving gear, a first driven gear and second driven gears mutually in mesh; a housing accommodating them and defining a flow path including a first suction port, a second suction port, a first pressure port and a second pressure port; a floating comprising a thrust face bearing a floating force exerted by fluids and first, second and third pressure-receiving faces respectively oriented in a direction opposed to the thrust face; a first pressurizing chamber having fluid connection with the first pressure port or the second pressure port to exert pressure on the first pressure-receiving face; a second pressurizing chamber having fluid connection with the first suction port to exert pressure on the second pressure-receiving face; and a third pressurizing chamber having fluid connection with the second suction port to exert pressure on the third pressure-receiving face.

3 Claims, 12 Drawing Sheets

(51) Int. Cl.
*F04C 2/14* (2006.01)
*F01C 21/02* (2006.01)
*F16C 25/04* (2006.01)
*F04C 2/08* (2006.01)
*F04C 2/10* (2006.01)
*F04C 15/00* (2006.01)
*F16C 17/02* (2006.01)
*F16C 17/18* (2006.01)

(52) U.S. Cl.
CPC ............... *F04C 2/14* (2013.01); *F04C 14/02* (2013.01); *F04C 14/24* (2013.01); *F04C 15/0042* (2013.01); *F16C 25/04* (2013.01); *F16C 17/02* (2013.01); *F16C 17/18* (2013.01); *F16C 2361/61* (2013.01)

(58) Field of Classification Search
CPC .......... F04C 14/24; F01C 21/02; F16C 25/04; F16C 17/02; F16C 17/18; F16C 2361/61
USPC .................................. 418/196, 206.1–206.9
See application file for complete search history.

(56) References Cited

U.S. PATENT DOCUMENTS

| | | | | |
|---|---|---|---|---|
| 2006/0275117 | A1* | 12/2006 | Matlack | F04C 15/0061 418/206.1 |
| 2008/0056926 | A1* | 3/2008 | Masuda | F04C 2/36 418/196 |
| 2009/0169408 | A1 | 7/2009 | Triebe et al. | |
| 2009/0230761 | A1 | 9/2009 | Sekiguchi et al. | |
| 2010/0247365 | A1 | 9/2010 | Masuda et al. | |
| 2012/0121450 | A1 | 5/2012 | Eckert et al. | |
| 2013/0330224 | A1* | 12/2013 | Cannata | F04C 2/36 418/196 |

FOREIGN PATENT DOCUMENTS

| | | | | |
|---|---|---|---|---|
| GB | 2 397 345 A | | 7/2004 | |
| JP | 2000179467 A | * | 6/2000 | ............... F04C 2/36 |
| JP | 2003-328958 | | 11/2003 | |
| JP | 2003328958 A | * | 11/2003 | ............... F04C 2/36 |
| JP | 2004-197573 | | 7/2004 | |
| JP | 2008-50979 | | 3/2008 | |
| JP | 2009-220603 | | 10/2009 | |
| JP | 2009-536992 | | 10/2009 | |
| JP | 2010-173471 | | 8/2010 | |
| JP | 2012-193693 | | 10/2012 | |

OTHER PUBLICATIONS

International Search Report dated Sep. 8, 2015 in PCT/JP2015/070384, filed on Jul. 16, 2015.
Written Opinion dated Sep. 8, 2015 in PCT/JP2015/070384, filed on Jul. 16, 2015.

* cited by examiner

TRIPLE GEAR PUMP AND FLUID SUPPLYING DEVICE

CROSS-REFERENCE TO RELATED APPLICATIONS

This application is a Continuation Application of PCT International Application No. PCT/JP2015/070384 (filed Jul. 16, 2015), the entire contents of which are incorporated herein by reference.

BACKGROUND

Technical Field

The disclosure herein relates to a triple gear pump in which one driving gear and two driven gears in mesh therewith respectively feed pressurized fluids, and a fluid supplying device that employs it to enable variability of feeding rates.

Description of the Related Art

For the purpose of feeding fuel to engines of aircrafts for instance, gear pumps have been used. A gear pump is in general comprised of a pair of gears in mesh and a housing accommodating them and, as the pair of gears rotates, expels fluid through a flow path defined by the housing. If there were no leakage around the gears, a feeding rate thereof should be in proportion to its rotating speed.

In an aircraft, rotation of the engine is extracted through a gear box to drive gears of a gear pump. Accordingly, the rotating speed of the gear pump necessarily increases in proportion to the rotating speed of the engine, thereby increasing the feeding rate of the fuel. A required fuel, however, does not necessarily increase in proportion to the rotating speed of the engine. In an instance of takeoff for example, a great amount of fuel is required in proportion to the rotation speed of the engine, whereas only a relatively small amount of fuel is required for cruising at a high altitude.

A triple gear pump has been proposed as a gear pump for reducing a feeding rate of fuel even when the rotating speed is relatively large. Japanese Patent Application Laid-open No. 2003-328958 discloses a related art.

SUMMARY

A floating bearing that is floatable along an axis is often applied to a bearing for a gear in a gear pump. As the gears exert pressure to fluid in the gear pump, its fluid pressure generates force on a floating bearing in a direction away from the gear. If a gap is formed between the floating bearing and the gear, the fluid would leak through this gap and this is a source for impairing efficiency of the gear pump. In order to prevent this, a constitution in which the pressurized fluid is in part introduced into the opposite side in the floating bearing to cancel the force and a biasing means is applied in order to properly bias the floating bearing toward the gear is often used.

In a triple gear pump, it is difficult to balance forces acting on the floating bearing with each other. The reason is that pressure of fluid around a driving gear differs between a normal mode and a half mode, which are named in the aforementioned patent literature, and therefore the pressures acting on the floating bearing differ. This problem could grow non-negligible when someone tried to make the gear pump generate greater feeding pressure. More specifically, how to achieve better balance in forces acting on the floating bearing so as to keep the balance within a tolerable range regardless of the operation modes is one of the technical problems for the triple gear pump.

A gear pump is comprised of a driving gear rotatable about a driving shaft, and first and second driven gears respectively meshing with the driving gear to follow rotation of the driving gear; a housing accommodating the driving gear, the first driven gear and the second driven gear, and defining a flow path including first and second suction ports capable of sucking fluids, a first pressure port employing rotation of the driving gear and the first driven gear to pressurize and discharge the fluid from the first suction port, a second pressure port employing rotation of the driving gear and the second driven gear to pressurize and discharge the fluid from the second suction port; a floating bearing supporting the driving gear so as to allow the driving gear to rotate about the driving shaft and being capable of floating along the driving shaft, and comprising a thrust face bearing a floating force exerted by the fluids along the driving shaft and first, second and third pressure-receiving faces respectively oriented in a direction opposed to the thrust face; a first pressurizing chamber held between the first pressure-receiving face and the housing and having fluid connection with the first pressure port or the second pressure port to exert pressure on the first pressure-receiving face; a second pressurizing chamber held between the second pressure-receiving face and the housing and having fluid connection with the first suction port to exert pressure on the second pressure-receiving face; and a third pressurizing chamber held between the third pressure-receiving face and the housing and having fluid connection with the second suction port to exert pressure on the third pressure-receiving face.

DETAILED DESCRIPTION OF THE EXEMPLARY EMBODIMENTS

Exemplary embodiments will be described hereinafter with reference to the appended drawings. It is particularly noted that these drawings are not always drawn to scale exactly and therefore dimensional relations among elements are not limited to those shown therein.

Figure 1:
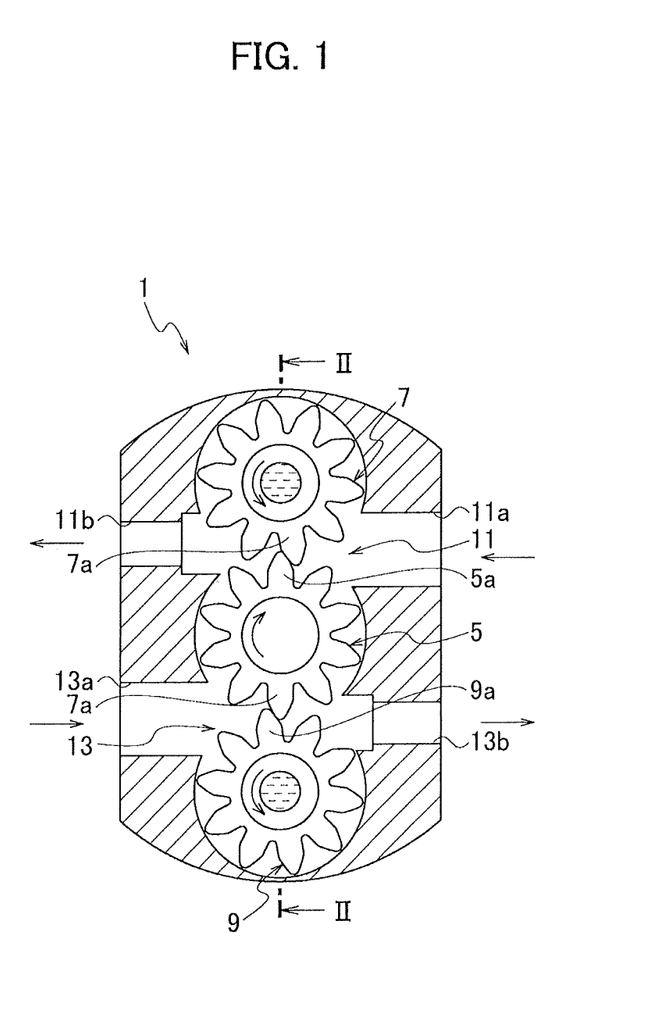
FIG. 1 is a sectional elevational view of a gear pump of an embodiment taken from a section perpendicular to a driving shaft.
Figure 3:
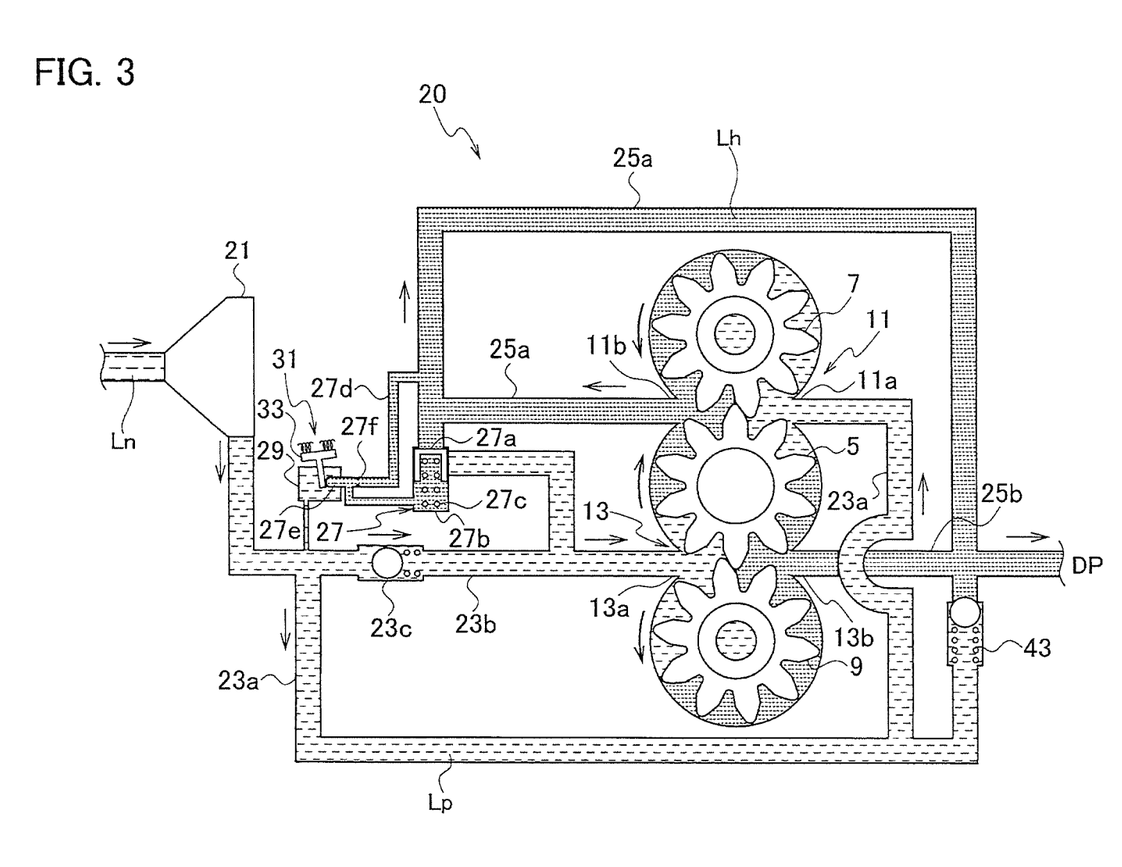
FIG. 3 is a block diagram of a fluid supplying device including the gear pump according to an example, which illustrates a case of parallel connection.
Figure 5:
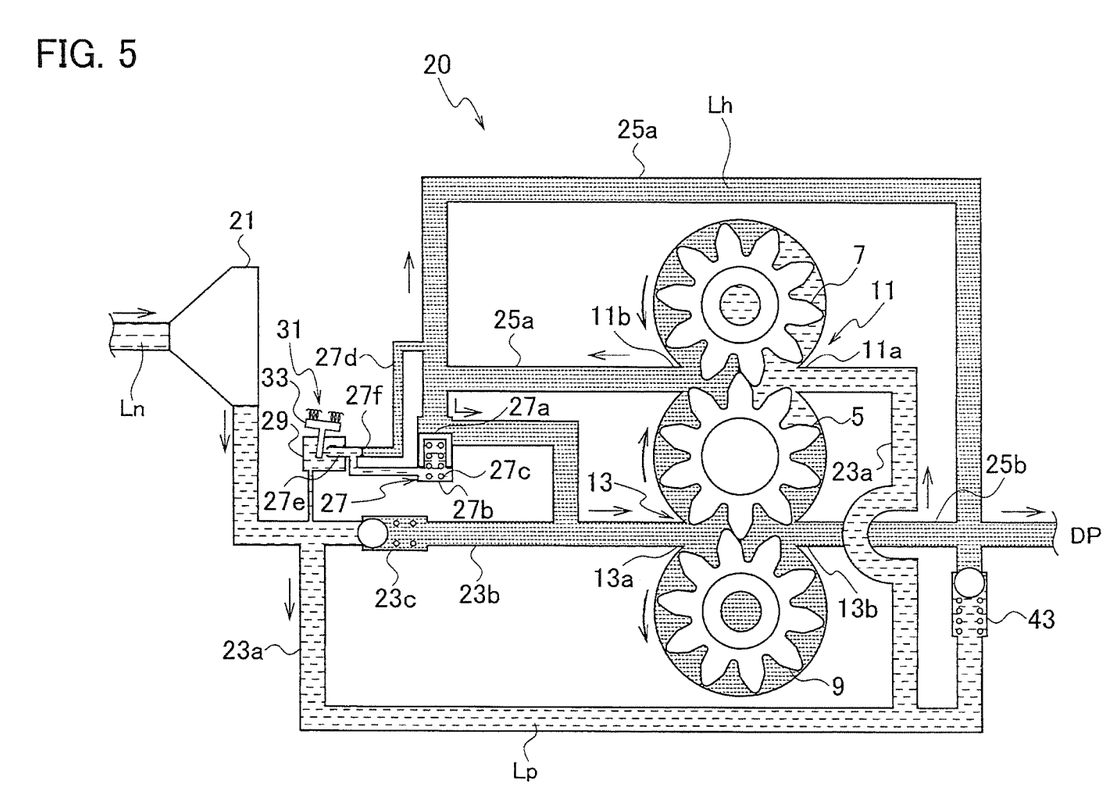
FIG. 5 is a block diagram of the fluid supplying device including the gear pump according to the example, which illustrates a case of series connection.

Referring mainly to FIG. 1, a gear pump 1 according to the present embodiment is in general comprised of a driving gear 5 rotating about a driving shaft, a first driven gear 7 and a second driven gear 9 respectively meshing with the driving gear 5 to follow rotation of the driving gear 5, and a housing 3 accommodating them and defining a flow path. The gear pump 1 is incorporated into a fluid supplying device 20 in a way as shown in FIGS. 3 and 5 for example and is used, but not limited, for supplying fuel such as kerosene to an engine of an aircraft.

Referring again to FIG. 1, the combination of the driving gear 5 and the first driven gear 7 constitutes a first gear pump 11 substantially. The flow path defined by the housing 3 and the gear teeth 5a, 7a, in combination with the housing around them, define spaces that respectively confine the fluid and the confined fluid is sequentially pushed out as the gears 5, 7 rotate. On the other hand, the flow path defined by the housing 3, in the front and the back of the first gear pump 11, includes a first suction port 11a for sucking the fluid and a first pressure port 11b. Specifically, the first gear pump 11, by its rotation, sucks the fluid through the first suction port 11a and pressurizes and expels it through the first pressure port 11b.

Similarly, the combination of the driving gear 5 and the second driven gear 9 constitutes a second gear pump 13 substantially. The gear teeth 5a and the gear teeth 9a in mesh with each other expel the fluid to suck the fluid through the second suction port 13a and pressurize and expel it through the second pressure port 13b.

As the first gear pump 11 and the second gear pump 13 are not placed in fluid isolation, part of the fluid in the first suction port 11a may pass around the driving gear 5 to go out of the second pressure port 13b and part of the fluid in the second suction port 13a may similarly pass around the driving gear 5 to go out of the first pressure port 11b.

To the gears 5, 7 and 9 applied are gears with identical radii and the identical number of teeth in order to realize identical discharge rates, but these gears may differ in radius and in number of teeth. Any forms of gears such as a spur gear or a skew gear can be applied to these gears and any forms such as a sine curve or a trochoid curve can be applied to the tooth form.

As will be described later in more detail, the gear pump 1 can be operated in two distinct modes. In a state where the first and second suction ports 11a, 13a are commonly connected to a source of the fluid and the first and second pressure ports 11b, 13b are commonly used for expelling the fluid as shown in FIG. 3 (parallel connection state), it produces a greater discharge rate. In contrast, in a state where only the first suction port 11a is connected to the source of the fluid and the second suction port 13a is connected to the first pressure port 11b as shown in FIG. 5 (series connection state), it produces a reduced discharge rate.

Figure 2:
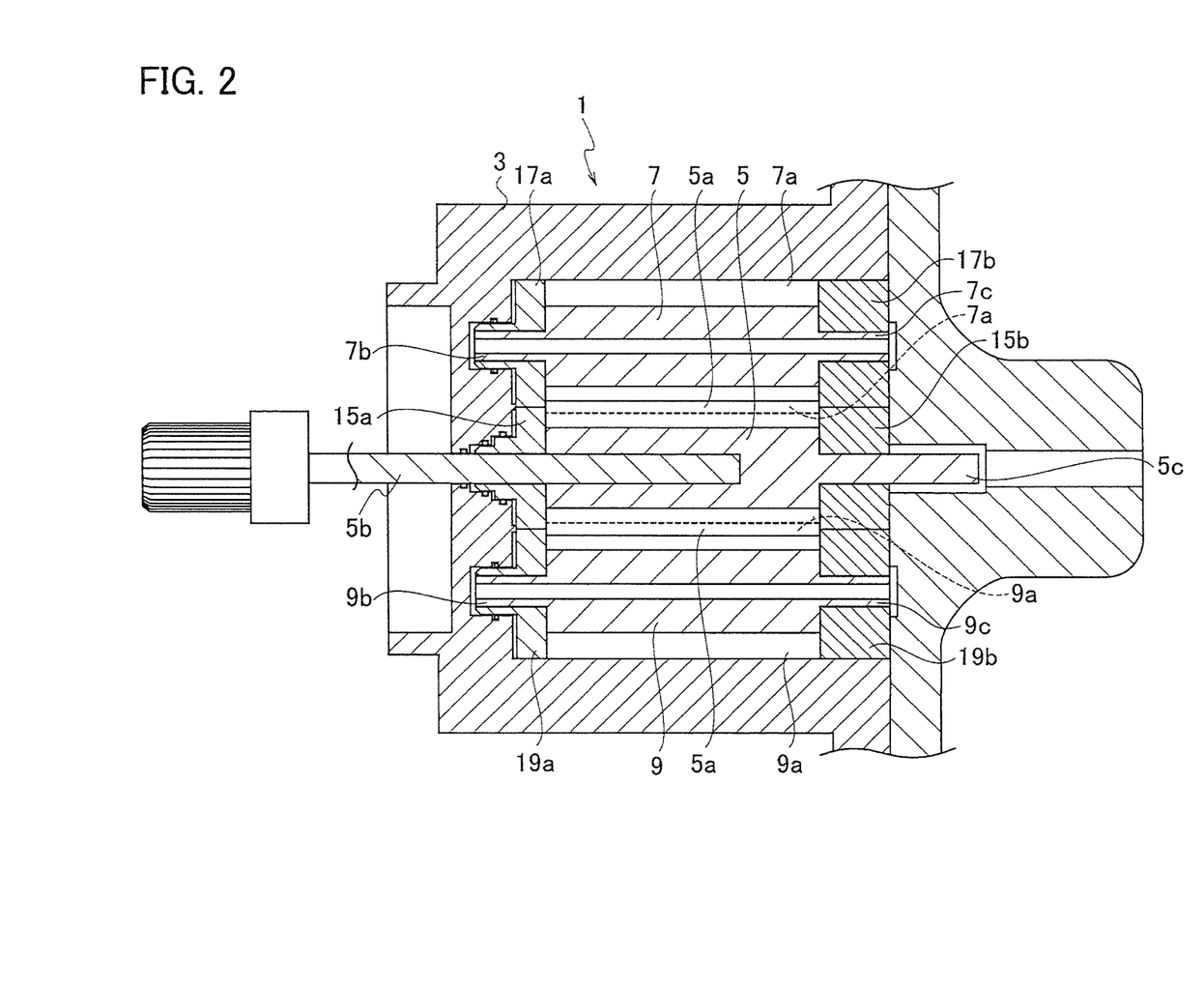
FIG. 2 is a sectional side view of the gear pump taken along a line II-II of FIG. 1.

Referring mainly to FIG. 2, the driving gear 5 is comprised of a rotary shaft 5b and a rotary shaft 5c in a unitary form or as separate bodies, and rotates about the rotary shafts 5b, 5c. The rotary shaft 5b may be a separate body from the rotary shaft 5c and these shafts may be combined to constitute a single shaft, but they may be formed in a unitary body. The rotary shafts 5b, 5c are the driving shaft coupled with a source of driving force such as a gear box.

The rotary shafts 5b, 5c are rotatably supported by bearings 15a, 15b and the driving gear 5 rotates about them. One of these bearings, the bearing 15a in the example shown in the drawings, is a floating bearing and the other is a fixed bearing. Alternatively, both of them may be floating bearings. The fixed bearing 15b is fixedly supported by the housing so as not to move in the axial direction but the floating bearing 15a is supported in a way as to be movable in the axial direction. As will be described later in more detail, in between the floating bearing 15a and the housing 3, a gap may be held in the axial direction.

Similarly, rotary shafts 7b, 7c of the driven gear 7 are rotatably supported by a floating bearing 17a and a fixed bearing 17b, and the floating bearing 17a is floatable in the axial direction. As well, rotary shafts 9b, 9c of the driven gear 9 are rotatably supported by a floating bearing 19a and a fixed bearing 19b, and the floating bearing 19a is floatable in the axial direction. In between the floating bearing 17a and the housing 3, and also in between the floating bearing 19a and the housing 3, gaps may be respectively held in the axial direction.

Figure 6:
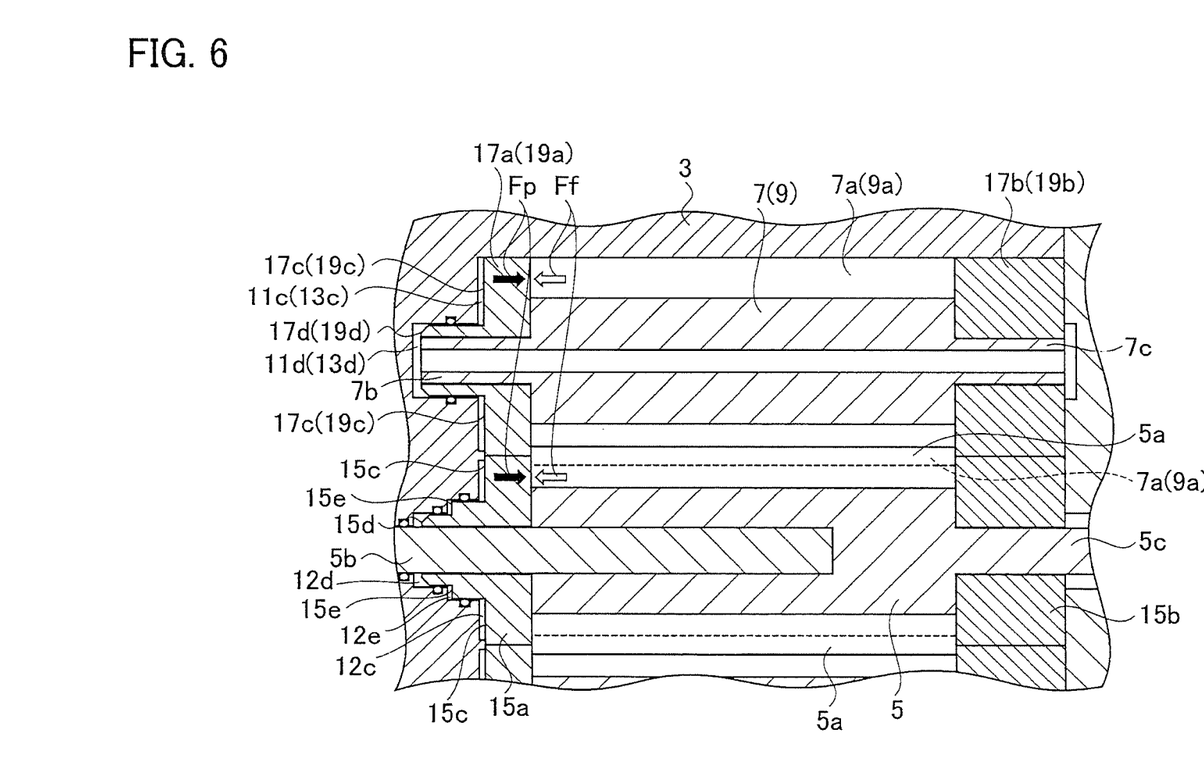
FIG. 6 is a sectional side view of a gear pump according to FIG. 2, which magnifies a part around a bearing.

Referring mainly to FIG. 6, one face of the floating bearing 17a (or 19a, similar hereinafter) may be flat, which is a thrust face that may have direct contact, for example, with the gear teeth 7a (9a) to bear a floating force Ff generated by the fluid pressure in the axial direction.

The floating bearing 17a (19a) is, at the side opposed to the thrust face, comprised of steps, preferably in a coaxial form, and a head thereof fits in the housing 3 to support the driven gear 7 (9) coaxially. A gap between a face 17d (19d) of the head and the housing 3 is a low-pressure pressurizing chamber 11d (13d) that is in communication with the first suction port 11a (second suction port 13a) to introduce a low-pressure fluid Lp as described later therein. The rotary shaft 7b, 7c (9b, 9c) may be hollow and have openings at both ends so that the fluid pass therethrough. On the other hand, a gap between a face 17c (19c) of its shoulder and the housing 3 is a high-pressure pressurizing chamber 11c (13c) that is in communication with the first pressure port 11b (second pressure port 13b) to introduce a high-pressure fluid Lh as described later therein. The high-pressure pressurizing chamber 11c (13c) is, by any seal member such as an O-ring, placed in fluid isolation from the low-pressure pressurizing chamber 11d (13d).

Among the faces opposed to the thrust face, the face 17d (19d) of the head is pressurized by the low-pressure pressurizing chamber 11d (13d) and the face 17c (19c) of the shoulder is pressurized by the high-pressure pressurizing chamber 11c (13c). A reaction force Fp as a net force thereof acts on the floating bearing 17a (19a). An ability of applying pressure by the first gear pump 11 (second gear pump 13) and areas of the face 17c (19c) and the face 17d (19d) are so designed as to substantially achieve balance between the floating force Ff and the reaction force Fp.

The floating bearing 15a of the driving shafts 5b, 5c has a similar structure, however, unlike the floating bearing 17a (19a), it is comprised of a third pressure-receiving face. Specifically, the floating bearing 15a has three steps in a coaxial form for example and is comprised of a face (first pressure-receiving face) 15c of its shoulder and a face (second pressure-receiving face) 15d of a head, and as well a third pressure-receiving face 15e. The third pressure-receiving face 15e is positioned in a midway between the pressure-receiving faces 15c, 15d for example. The faces 15c, 15d, 15e are respectively opposed to the pressurizing chambers 12c, 12d, 12e and the pressurizing chambers 12c, 12d, 12e are, by any seal member such as an O-ring, placed in fluid isolation from each other.

The first pressurizing chamber 12c is put in fluid connection with the first pressure port 11b or the second pressure port 13b to exert pressure on first pressure-receiving face 15c. The second pressurizing chamber 12d is put in fluid connection with the first suction port 11a to exert pressure on the second pressure-receiving face 15d. The third pressurizing chamber 12e is put in fluid connection with the second suction port 13a to exert pressure on the third pressure-receiving face 15e. As shown in the drawings, these pressures generate the reaction force Fp as a net force. This reaction force is not necessarily identical to the reaction force as described above. As will be described later in more detail, pressure acting on the third pressure-receiving face 15e depends on whether it is in the parallel connection state or the series connection state, thereby changing the reaction force Fp.

Referring mainly to FIG. 3, the fluid supplying device 20 is in general comprised of a boost pump 21, first and second supplying paths 23a, 23b, first and second discharge paths 25a, 25b, and the aforementioned gear pump 1 connected to them. Non-pressurized fluid Ln extracted out of a fuel tank or such is pressurized at relatively low pressure by the boost pump 21 and this low-pressure fluid Lp is supplied through the first and second supplying paths 23a, 23b to the gear pump 1, and the high-pressure fluid Lh pressurized therein is expelled through the first and second discharge paths 25a, 25b out of a discharge port DP. The discharge port DP is for example connected to the engine.

The first supplying path 23a establishes fluid connection between the boost pump 21 and the gear pump 1, and its main path is led to and connected with the first suction port 11a. A part thereof branches off and has communication with the second supplying path 23b, and the second supplying path 23b is led to and connected with the second suction port 13a. Preferably, at any section between them, a check valve 23c is interposed in order to prevent reverse flow from the second supplying path 23b to the first supplying path 23a. The check valve 23c is in a steady state opened but its valve body moves back only when the pressure in the second supplying path 23b considerably increases, thereby cutting off fluid communication therebetween.

The first supplying path 23a may further branch off and has communication with the discharge port DP, and a check valve 43 is preferably interposed therebetween. The check valve 43 withstands the pressure by the high-pressure fluid Lh to prevent reverse flow. The pressure in the discharge paths 25a, 25b could, only when it unexpectedly increases, overcome the resistive force by the check valve 43 to open the check valve 43. Specifically, the check valve 43 functions as a relief valve against excessive pressure.

The first discharge path 25a establishes fluid connection between the first pressure port 11b and the discharge port DP. The second discharge path 25b is connected to the second pressure port 13b and is further merged with the first discharge path 25a and establishes fluid connection with the discharge port DP.

The first discharge path 25a branches off and has connection with the second supplying path 23b via a valve 27. The valve 27, under external control, opens and closes a route between the first discharge path 25a and the second supplying path 23b. Specifically, when the gear pump 1 operates in the parallel connection state as shown in FIG. 3, the valve 27 is closed, and when in the series connection state as shown in FIG. 5, the valve 27 is opened (both are in fluid communication).

Figure 4:
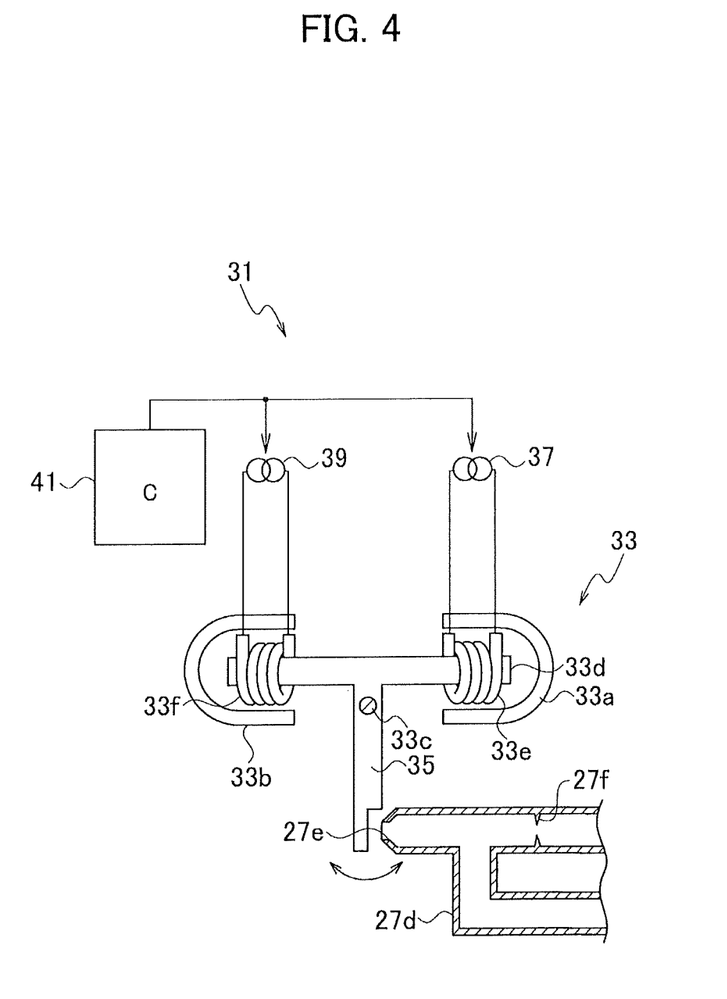
FIG. 4 is a schematic view of a nozzle-flapper mechanism used in the fluid supplying device of FIG. 3.

Although any form of valves can be applied to the valve 27 as long as it has controllability in opening and closing, a combination of a differential pressure regulating valve and a nozzle-flapper mechanism 31 illustrated in FIG. 4 is applicable thereto for example.

Referring again to FIG. 3, in the case of the differential pressure regulating valve, the valve 27 is for example comprised of a valve chamber 27b, a valve body 27a movable forward and rearward within the valve chamber 27b, and a spring 27c biasing the valve body 27a forward or rearward. In the illustrated example, the spring 27c presses the valve body 27a in a direction where the valve 27 is to be closed, the second supplying path 23b is then isolated from the first discharge path 25a and the gear pump 1 comes into the parallel connection state as shown in FIG. 3. When sufficient differential pressure is given to the valve body 27a, more specifically the pressure in the first discharge path 25a is sufficiently higher than that in the valve chamber 27b, the differential pressure overcomes the biasing force by the spring 27c to make the valve body 27a move rearward, thereby opening the valve 27. Then the second supplying path 23b is put in fluid communication with the first discharge path 25a and the gear pump 1 comes into the series connection state as shown in FIG. 5.

For the purpose of controlling the differential pressure on the valve body 27a, the nozzle-flapper mechanism shown in FIG. 4 is applicable. The nozzle-flapper mechanism 31 is in general comprised of a nozzle 27e and flapper 35 disposed adjacent to the nozzle 27e.

Referring to FIGS. 3, 5 in combination with FIG. 4, the nozzle 27e is in fluid communication with both a first discharge path 25a and a valve chamber 27b via a reference path 27d. Meanwhile, the tip end of the nozzle 27e and the body of the flapper 35 are preferably housed in the chamber 29 in a liquid-tight form and the chamber 29 is for example in communication with the first supplying path 23a, so that the pressure by the first supplying path 23a is applied to the exterior of the nozzle 27e and the fluid expelled out of the nozzle 27e is recovered.

The reference path 27d is comprised of a throttle 27f at a site closer to the first discharge path 25a than the nozzle 27e. Unless the flapper 35 closes the nozzle 27e, the fluid can gush out of the nozzle 27e in accordance with the pressure in the first discharge path 25a. As the fluid then passes through the throttle 27f, it creates a pressure loss, thereby creating a differential pressure. On the other hand, if the flapper 35 gets close to the nozzle 27e, it disturbs the gush of the fluid, which reduces the pressure loss by the throttle 27f and therefore reduces the differential pressure. Specifically, by regulating the position of the flapper 35 relative to the nozzle 27e, the differential pressure on the valve body 27a can be regulated.

To regulate the position of the flapper 35 relative to the nozzle 27e, a torque motor 33 and a controller 41 for controlling the torque motor 33 are for example applicable.

The flapper 35 is pivoted on a fulcrum 33c and is further provided with an armature 33d elongated from the fulcrum 33c. The torque motor 33 is comprised of coils 33e, 33f and permanent magnets 33a, 33b. While the flapper 35 of itself is preferably vertical, the armature 33d is preferably horizontal and the coils 33e, 33f are wound around one or both ends thereof. The flapper 35 may be further comprised of a torsion spring to bias the flapper 35 in one direction around the fulcrum 33c.

These coils 33e, 33f are respectively connected with current sources 37, 39 and the permanent magnets 33a, 33b are fixedly disposed close to them. The power output by the current sources 37, 39 is controlled by the controller 41.

As one or both the currents from the current sources 37, 39 are regulated under control by the controller 41, magnetic forces generated by the coils 33e, 33f swing the flapper 35 around the fulcrum 33c and its position relative to the nozzle 27e is finely regulated, so that the nozzle-flapper mechanism 31 can control the differential pressure on the valve body 27a. Specifically, the nozzle-flapper mechanism can control the valve 27 to open and close. As the position of the flapper 35 can be stepwise or continuously regulated, the aperture of the valve 27 can be also stepwise or continuously regulated.

The nozzle-flapper mechanism 31 may be further comprised of a sensor for detecting displacement of the flapper 35, or any other proper sensor, and the controller 41 may use this sensor to execute feed-back control. Only one of the current sources 37, 39 may be constantly operated and the other may be used as a backup.

More specifically, as shown in FIG. 3, as the controller 41 causes the flapper 35 to move closer to the nozzle 27e, the valve 27 closes because a differential pressure is not created, and the check valve 23c opens, so that the boost pump 21 supplies the low-pressure fluid Lp to both the first and second supplying paths 23a, 23b. As the gear pump 1 operates in the parallel connection state and both the first gear pump 11 and the second gear pump 13 contribute toward pressurizing and supplying the fluid, it can create a relatively large feeding rate. As described already, this operation is used in the instance where a relatively large amount of fuel is required as compared with the rotating speed of the engine, such as the instance where the aircraft is to take off.

On the other hand, as shown in FIG. 5, as the controller 41 causes the flapper 35 to move away from the nozzle 27e, the valve 27 opens as the differential pressure is created. Then the high-pressure fluid Lh flows into the second supplying path 23b and therefore high pressure acts on the check valve 23c so that the check valve 23c isolates the second supplying path 23b from the first supplying path 23a. The boost pump 21 supplies the low-pressure fluid Lp only to the first supplying path 23a. The gear pump 1 operates in the series connection state and an outlet pressure of the first gear pump 11 acts on the inlet of the second gear pump 13. As the second gear pump 13 does not contribute to increase in the feeding rate, the gear pump 1 as a whole reduces the feeding rate. As described already, this operation is used in the instance where a relatively small amount of fuel is required as compared with the rotating speed of the engine, such as the instance where the aircraft cruises at high altitude.

As will be understood from the above descriptions, whether the operation is in the parallel connection state or in the series connection state, the first driven gear 7 raises the pressure of the low-pressure fluid Lp and expels it as the high-pressure fluid Lh. Regardless of the connection states, the floating force Ff and the reaction force Fp acting on the floating bearing 17a stay stable. In comparison therewith, action of the driving gear 5 is characteristic as described below.

Figure 7A:
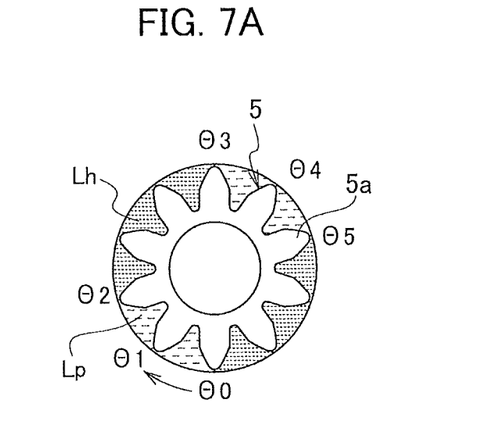
FIG. 7A is an elevational sectional view showing a driving gear and fluid in a state of the parallel connection according to FIG. 3.
Figure 7B:
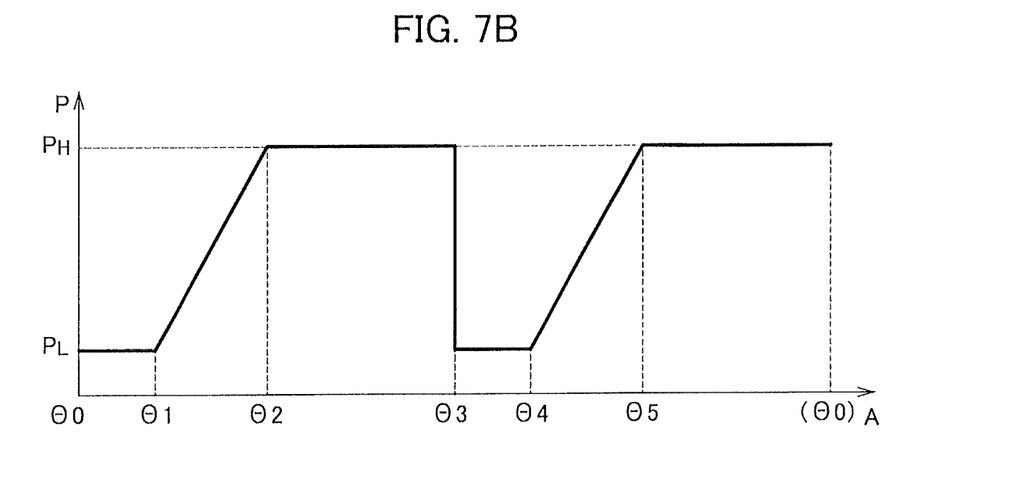
FIG. 7B is a graph showing a pressure distribution of the fluid in a circumferential direction of the driving gear in a way comparable to FIG. 7A.

Referring to FIG. 7A and FIG. 7B, when the driving gear 5 rotates with pressurizing the fluid, the gear teeth 5a in the range of angles from θ0 to θ1 around the first suction port 11a get in contact with fluid at a low pressure PL. The gear teeth 5a advancing in the range of angles from θ1 to θ2 raise the pressure of the fluid from the low pressure PL up to a high pressure PH and in the range of angles from θ2 to θ3 again get in contact with fluid at the high pressure PH. In the parallel connection state, as the low-pressure fluid Lp is supplied also to the second suction port 13a, a similar pressure profile is created in ranges symmetric to the above ranges. An integral of these pressure profiles is a source of the floating force Ff acting on the floating bearing 15a.

Figure 8A:
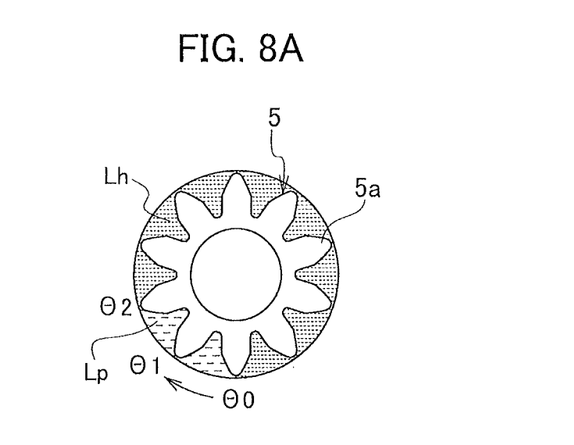
FIG. 8A is an elevational sectional view showing the driving gear and the fluid in a state of the series connection according to FIG. 5.
Figure 8B:
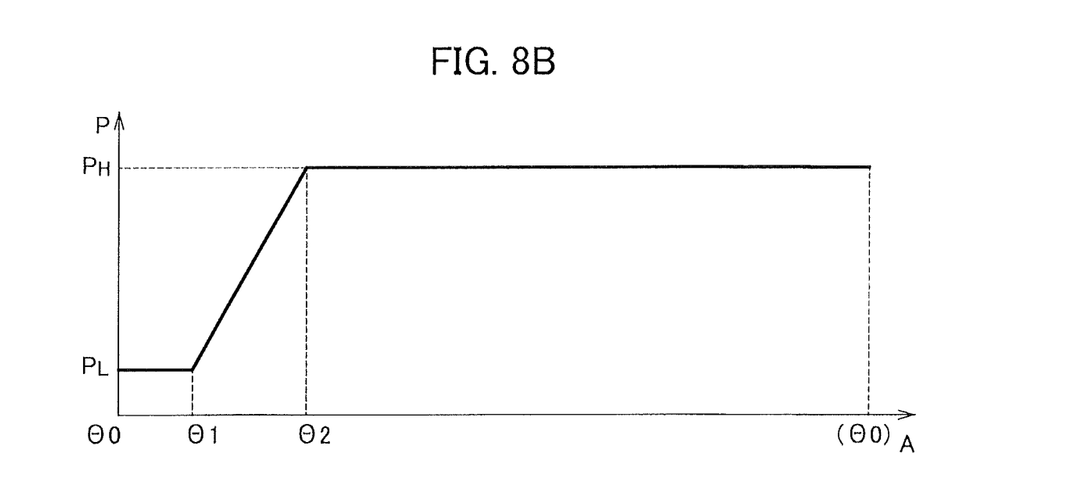
FIG. 8B is a graph showing a pressure distribution of the fluid in a circumferential direction of the driving gear in accordance with FIG. 8A.

Referring to FIG. 8A and FIG. 8B, in the series connection state, as the second suction port 13a receives supply of the high-pressure fluid Lh pressurized already, the constant high pressure PH is created also in the range of angles from θ3 to θ5. The floating force Ff acting on the floating bearing 15a is accordingly larger than that in the parallel connection state.

More specifically, if the floating bearing 15a had a structure similar to those of the floating bearings 17a, 19a, either one the following cases would occur. In one case, the floating force Ff is overly small as compared with the reaction force Fp in the parallel connection state, and in the other case, the floating force Ff is overly large as compared with the reaction force Fp in the series connection state.

Figure 9:
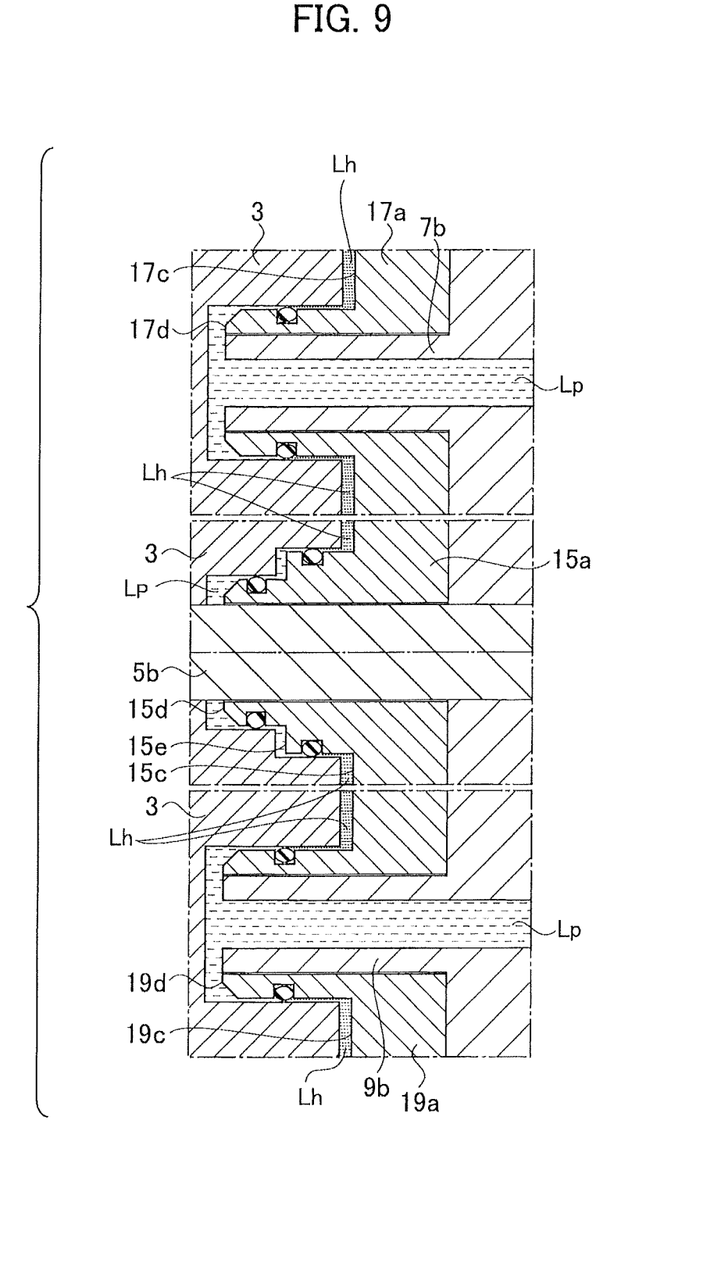
FIG. 9 is an enlarged sectional view particularly showing respective bearings and fluid in a state of the parallel connection according to FIG. 3.
Figure 10:
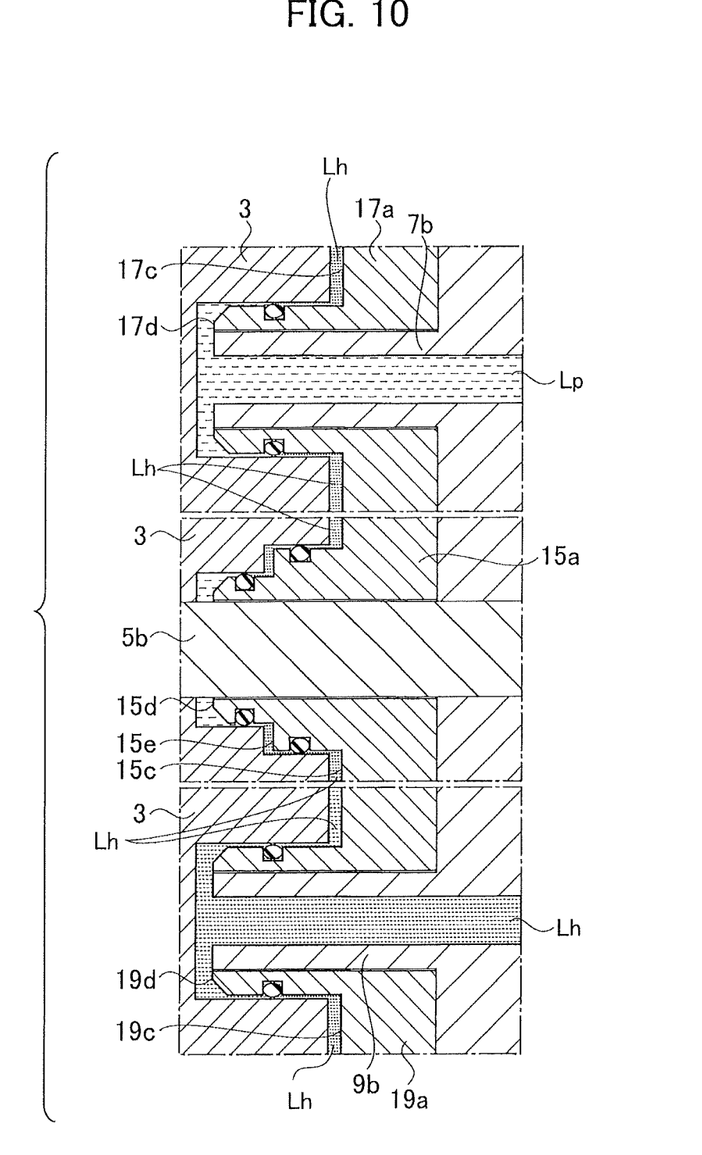
FIG. 10 is an enlarged sectional view particularly showing respective bearings and fluid in a state of the series connection according to FIG. 5.

In the present embodiment, however, as described already, the floating bearing 15a is comprised of the third pressure-receiving face 15e and the pressurizing chamber 12e is in fluid communication with the second suction port 13a. Accordingly, in the parallel connection state shown in FIG. 3, the low-pressure fluid Lp acts on the third pressure-receiving face 15e as shown in FIG. 9. On the other hand, in the series connection state shown in FIG. 5, the high-pressure fluid Lh acts on the third pressure-receiving face 15e as shown in FIG. 10. In the parallel connection state, as described above, while the floating force Ff is relatively small, the pressure applied to the third pressure-receiving face 15e is also small. Thus the balance between the floating force Ff and the reaction force Fp can be kept within the tolerable range. In the series connection state, although the floating force Ff grows relatively large, the pressure applied to the third pressure-receiving face 15e also increases. The balance between the floating force Ff and the reaction force Fp can be accordingly kept within the tolerable range, too.

Specifically, in the present embodiment, even though operation modes are switched between the parallel connection state and the series connection, the balance between the floating force Ff and the reaction force Fp acting on the floating bearing continues to be steadily kept within the tolerable range. The floating bearing is prevented from being overly pressed against the gear to wear and the floating bearing is prevented from floating to cause the fluid to leak out.

Further, the present embodiment can, at the transient period in switching the operation modes between the parallel connection state and the series connection state, prevent the floating bearing from being suffered transient shocks. At the period when the parallel connection state is switched into the series connection state for example, if the valve 27 is abruptly opened, the pressure by the high-pressure fluid Lh suddenly applies to the second supplying path 23b and thereby the pressure in the second suction port 13a steeply increases. This causes drastic shocks to the respective floating bearings in the second gear pump 13 and may give rise to pressure fluctuation throughout the device. To prevent this, the aperture of the valve 27 may be stepwise or continuously changed. As the present embodiment employs the nozzle-flapper mechanism 31 to regulate opening and closing the valve 27, such an operation can be readily executed.

Meanwhile in the above embodiment, while the floating bearing in the embodiment described above is comprised of three sets of pressurizing chambers and pressure-receiving faces, any greater number of sets of them could be applied. Moreover, plural sets of nozzle-flapper mechanisms could be applied. These plural sets of nozzle-flapper mechanisms can be used for the purpose of stepwise or continuously changing pressures on the respective pressure-receiving faces.

Figure 11:
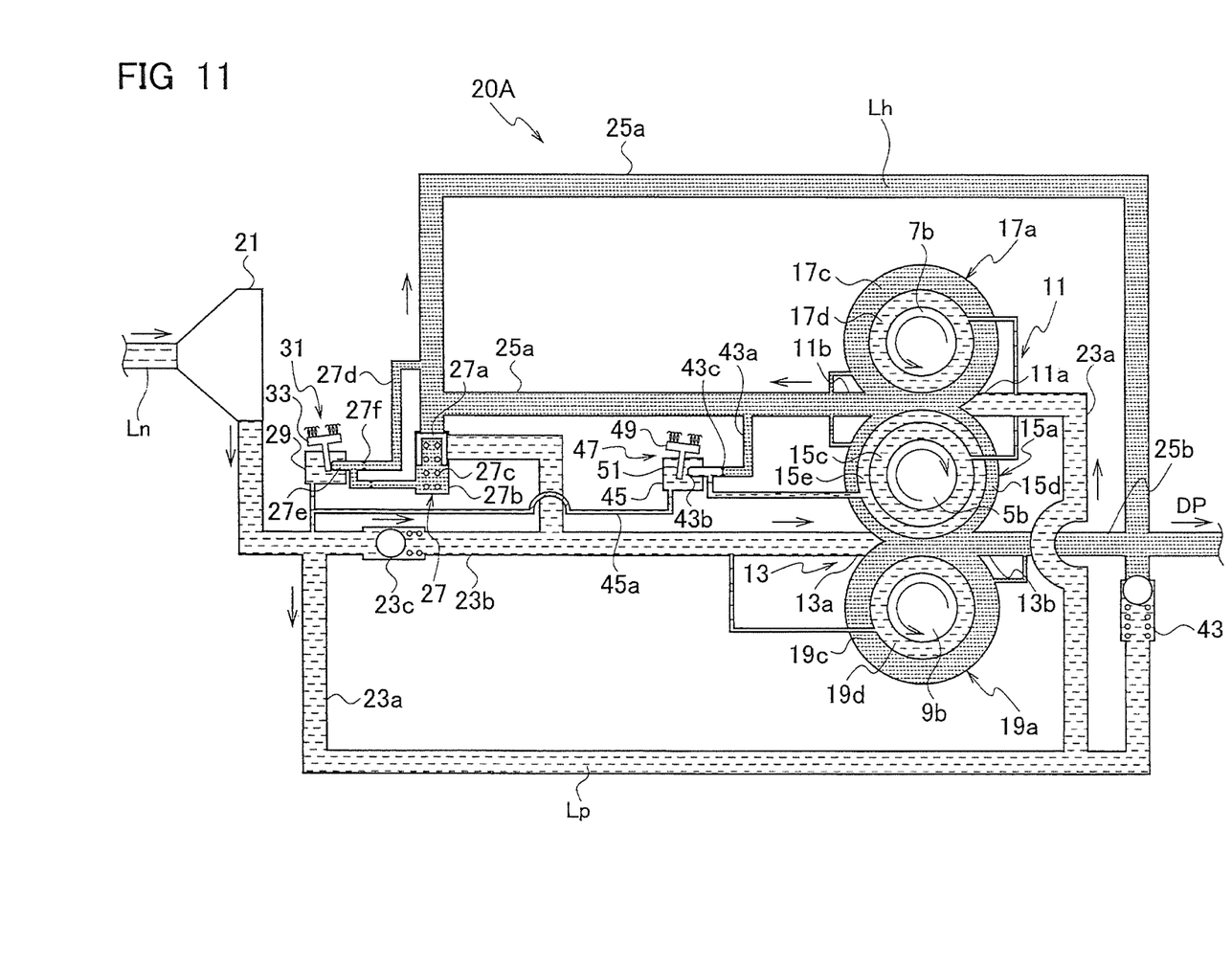
FIG. 11 is a block diagram of a fluid supplying device of a second embodiment, which shows a case of parallel connection.
Figure 12:
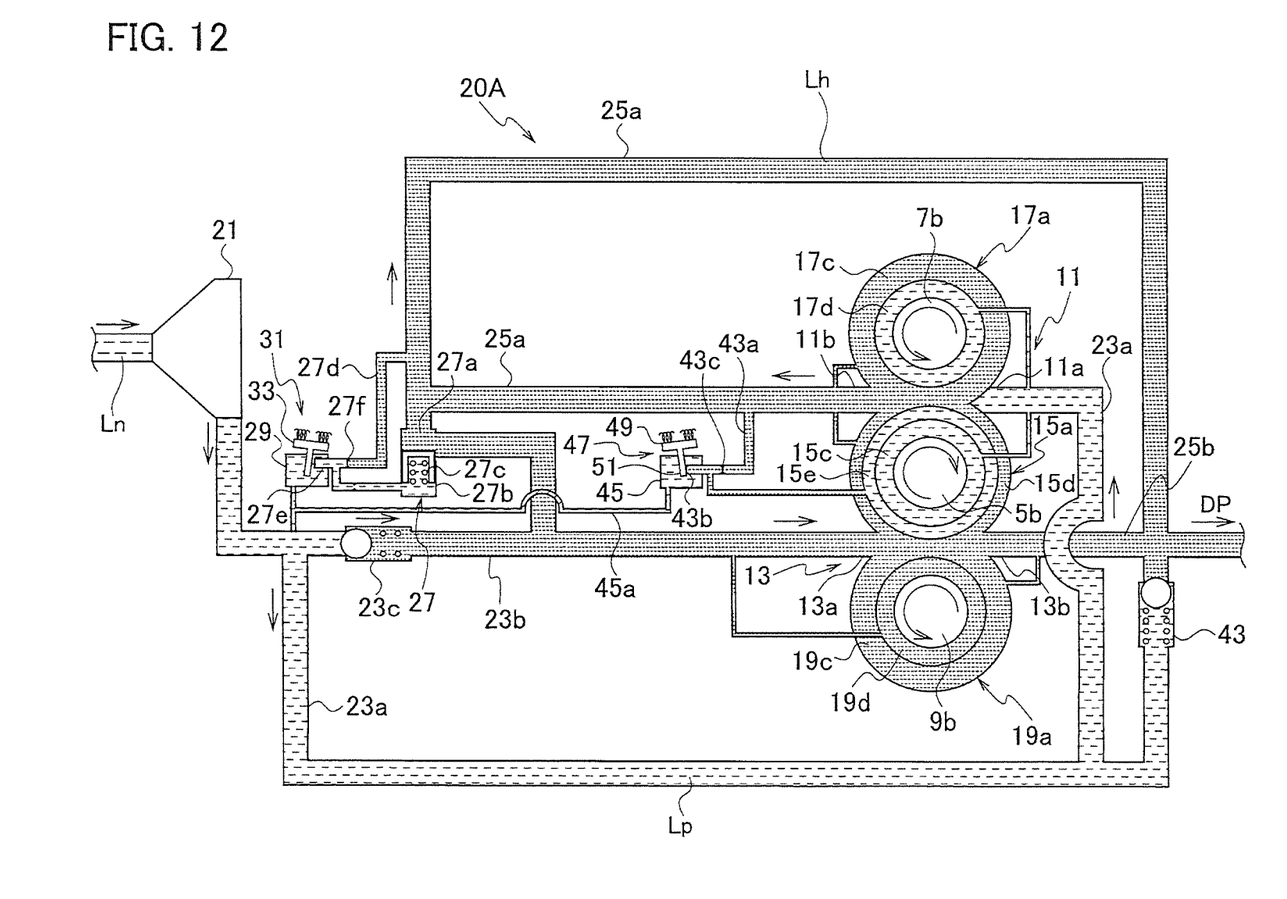
FIG. 12 is a block diagram of the fluid supplying device of the second embodiment, which shows a case of series connection.

FIGS. 11, 12 show an example of modified embodiments. While a fluid supplying device 20A according to the embodiment has a structure partly common with that of the fluid supplying device 20 as described already, this device is further comprised of a second nozzle-flapper mechanism 47. Its nozzle 43b is in fluid communication with the first discharge path 25a and the third pressurizing chamber 12e via a pressurizing path 43a. Its chamber 45 is, via a communication flow path 45a, put in communication with the chamber 29 of the first nozzle-flapper mechanism 31 for example, so that the pressure by the first supplying path 23a is applied to the exterior of the nozzle 43b and the fluid expelled out of the nozzle 43b is recovered. The pressurizing path 43a is comprised of a throttle 43c at a site closer to the first discharge path 25a than the nozzle 43b. Further the second nozzle-flapper mechanism 47 is comprised of a flapper 51 comprising a torque motor 49 and the flapper 51 is pivoted as being close to the nozzle 43b. Although not shown therein, any controller for controlling the torque motor 49 is applicable.

As the torque motor 49 is in action to move the flapper 51 away from the nozzle 43b, pressures on both sides of the throttle 43c are differentiated. As fluid exchange between the nozzle 43b and the chamber 45 is made freer, the pressure downstream relative to the throttle 43c is getting closer to the pressure in the first supplying path 23a. In comparison, as the flapper 51 gets closer to the nozzle 43b, the pressure downstream relative to the throttle 43c is as shown in FIG. 12 getting closer to the pressure in the first discharge path 25a.

The fluid supplying device 20A according to the present embodiment can operate in a way as described below.

As shown in FIG. 11, in the parallel connection state, the first nozzle-flapper mechanism 31 in a steady state closes the valve 27 and the second supplying path 23b is thereby isolated from the first discharge path 25a. The second nozzle-flapper mechanism 47 simultaneously keeps the flapper 51 away from the nozzle 43b. The low-pressure fluid Lp is accordingly introduced into the third pressurizing chamber 12e as with the example of FIG. 9, and pressurizes the third pressure-receiving face 15e. As described already, the floating force Ff is relatively small but the pressure acting on the third pressure-receiving face 15e is also small, thereby the balance between the floating force Ff and the reaction force Fp can be kept within the tolerable range.

In a case where the parallel connection state transits into the series connection state shown in FIG. 12, the first nozzle-flapper mechanism 31 opens the valve 27 and the second supplying path 23b gets in fluid communication with the first discharge path 25a. The second nozzle-flapper mechanism 47 in response stepwise or continuously makes the flapper 51 closer to the nozzle 43b. Then, in response to this, the pressure in the third pressurizing chamber 12e increases stepwise or continuously.

In a case where the series connection state transits into the parallel connection state as well, the pressure in the third pressurizing chamber 12e can be similarly decreased gradually.

Specifically, the present embodiment can effectively prevent rapid transition of the pressure acting on the third pressure-receiving face 15e. This effectively prevents drastic shocks to the respective floating bearings in the second gear pump 13 and more effectively prevents pressure fluctuation throughout the device.

Although certain embodiments have been described above, modifications and variations of the embodiments described above will occur to those skilled in the art, in light of the above teachings.

INDUSTRIAL APPLICABILITY

A triple gear pump and a fluid supplying device are provided, which achieve better balance in forces acting on a floating bearing so as to keep the balance within a tolerable range regardless of operation modes and suppresses leakage of fluid through a gap between the floating bearing and the gear.

What is claimed is:
1. A gear pump comprising:
   a driving gear rotatable about a driving shaft, and first and second driven gears respectively meshing with the driving gear to follow rotation of the driving gear;
   a housing accommodating the driving gear, the first driven gear and the second driven gear, and defining a flow path including first and second fluid suction ports, a first pressure port employing rotation of the driving gear and the first driven gear to pressurize and discharge the fluid from the first fluid suction port, a second pressure port employing rotation of the driving gear and the second driven gear to pressurize and discharge the fluid from the second fluid suction port;
   a floating bearing supporting the driving gear so as to allow the driving gear to rotate about the driving shaft and floating along the driving shaft, and the floating bearing further comprising a thrust face which bears a floating force exerted by the fluids along the driving shaft, and the floating bearing further comprising first, second and third pressure-receiving faces respectively oriented in a direction opposed to the thrust face;
   a first pressurizing chamber held between the first pressure-receiving face and the housing, the first pressurizing chamber having fluid connection with the first pressure port or the second pressure port in order to exert pressure on the first pressure-receiving face;
   a second pressurizing chamber held between the second pressure-receiving face and the housing, the second pressurizing chamber having fluid connection with the first suction port in order to exert pressure on the second pressure-receiving face; and
   a third pressurizing chamber held between the third pressure-receiving face and the housing, the third pressuring chamber having fluid connection with the second suction port in order to exert pressure on the third pressure-receiving face.

2. A fluid supplying device comprising:
- a gear pump;
- a changeover valve controllably opening and closing a route between a first pressure port and a second suction port; and
- a valve isolating the second suction port from the first suction port, wherein the gear pump comprises:
- a driving gear rotatable about a driving shaft, and first and second driven gears respectively meshing with the driving gear to follow rotation of the driving gear;
- a housing accommodating the driving gear, the first driven gear and the second driven gear, and defining a flow path including first and second fluid suction ports, the first pressure port employing rotation of the driving gear and the first driven gear to pressurize and discharge the fluid from the first fluid suction port, the second pressure port employing rotation of the driving gear and the second driven gear to pressurize and discharge the fluid from the second fluid suction port;
- a floating bearing supporting the driving gear so as to allow the driving gear to rotate about the driving shaft and float along the driving shaft, and the floating bearing further comprising a thrust face which bears a floating force exerted by the fluids along the driving shaft, and the floating bearing further comprising first, second and third pressure-receiving faces respectively oriented in a direction opposed to the thrust face;
- a first pressurizing chamber held between the first pressure-receiving face and the housing, the first pressurizing chamber having fluid connection with the first pressure port or the second pressure port in order to exert pressure on the first pressure-receiving face;
- a second pressurizing chamber held between the second pressure-receiving face and the housing, the second pressurizing chamber having fluid connection with the first suction port in order to exert pressure on the second pressure-receiving face, and
- a third pressurizing chamber held between the third pressure-receiving face and the housing, the third pressuring chamber having fluid connection with the second suction port in order to exert pressure on the third pressure-receiving face.

3. The fluid supplying device of claim 2, further comprising:
- a pressurized path establishing fluid connection between the first pressure port and the third pressurizing chamber;
- a communication path establishing fluid connection between the pressurized path and the first suction port; and
- an on-off valve closably establishing fluid communication between the pressurized path and the communication path, an aperture of the on-off valve being changeable stepwise or continuously in response to opening and closing of the changeover valve.

* * * * *